United States Patent [19]

Griffin et al.

[11] Patent Number: 4,745,106

[45] Date of Patent: * May 17, 1988

[54] HEPARIN DERIVATIVES HAVING IMPROVED ANTI-XA SPECIFICITY

[76] Inventors: Charles C. Griffin, 710 Melissa Dr., Oxford, Ohio 45056; Kevin M. Foley, 5757 Lynn St., Franklin, Ohio 45005; Eduardo Amaya, 811 Sands Ave., Monroe, Ohio 45050

[*] Notice: The portion of the term of this patent subsequent to May 17, 2005 has been disclaimed.

[21] Appl. No.: 898,436

[22] Filed: Aug. 20, 1986

[51] Int. Cl.[4] ............... A61K 31/725; C08B 37/10
[52] U.S. Cl. .......................... 514/56; 514/822; 536/21
[58] Field of Search ............... 536/21; 514/56, 822

[56] References Cited

U.S. PATENT DOCUMENTS

| 3,835,112 | 6/1971 | Mardiguian | 536/21 |
|---|---|---|---|
| 4,281,108 | 7/1981 | Fussi | 536/21 |
| 4,303,651 | 12/1981 | Lindahl | 514/56 |
| 4,331,697 | 3/1982 | Kudo et al. | 427/2 |
| 4,351,938 | 9/1982 | Barnett | 536/21 |
| 4,396,762 | 8/1983 | Langer | 536/21 |
| 4,401,662 | 8/1983 | Lormeau | 514/56 |
| 4,401,758 | 8/1983 | Lormeau | 435/84 |
| 4,415,559 | 11/1983 | Suzuki | 514/56 |
| 4,438,108 | 3/1984 | Sanders | 514/56 |
| 4,438,261 | 3/1984 | Barnett | 536/21 |
| 4,440,926 | 4/1984 | Mardiguian | 536/21 |
| 4,474,770 | 10/1984 | Lormeau | 514/56 |
| 4,486,420 | 12/1984 | Lormeau | 514/56 |
| 4,500,519 | 2/1985 | Lormeau | 514/56 |
| 4,533,549 | 8/1985 | Lasker | 514/56 |

FOREIGN PATENT DOCUMENTS

| 1195322 | 10/1985 | Canada | 536/21 |
|---|---|---|---|
| 2002406 | 8/1982 | United Kingdom | 536/21 |

*Primary Examiner*—John Rollins

[57] ABSTRACT

Acetyl ester derivatives of heparin are disclosed. These derivatives exhibit improved Anti-Xa activity in relation to their global anticlotting activity.

17 Claims, No Drawings

HEPARIN DERIVATIVES HAVING IMPROVED ANTI-XA SPECIFICITY

This invention relates to heparin derivatives possessing increased anti-Xa/APTT ratios, and more particularly to acetyl ester derivatives of heparin.

The chemical structure of heparin is complex. Heparin is not a single compound, but rather is a mixture of compounds. However, heparin is commonly thought to primarily be a polymeric substance made up of tetrasaccharide repeating units. On the average each tetrasaccharide repeating unit contains approximately 5 free hydroxyl groups and has a molecular weight of approximately 1229. The average molecular weight of commercially available heparin varies from about 10,000 to about 18,000. Thus, on the average, commercially available heparin contains approximately 8 to 15 tetrasaccharide repeating units.

The term heparin is used in the specification and the claims in its broadest sense, in order to designate either a commercial heparin of pharmaceutical grade or a crude heparin such as obtained by extraction from biological material, particularly from mammalian tissue, or a mucopolysaccharide exhibiting anticoagulant properties that is synthesized from non heparin sources.

Heparin is the most widely used agent for immediate management of most thromboembolic disorders, particularly, deep vein thrombosis and pulmonary and systemic emboli. An important problem is that the dosage must be balanced in such a manner that good thrombosis protection is obtained while bleeding complications are avoided. In many instances, bleeding or hemorrhaging has been a major problem, some investigators reporting the incidence of hemorrhaging to be as high as 35 percent.

Heparin functions to block the coagulation cascade at various sites by interfering with a multiplicity of blood factors including factor Xa. Anti-Xa activity which is accompanied by little global anticoagulant activity is indicative of strong antithrombotic activity while avoiding the risk of hemorrhage. It should be noted that heparin simultaneously depresses a large number of the coagulation factors participating in the creation and the maintenance of different forms of hypercoagulability. Thus, heparin's activity appears to be global rather than specific.

APTT and USP anticoagulant assays are recognized as measuring global anticoagulant activity. We prefer to use the APTT assay to measure global anticoagulant activity.

Heparin is currently the medication of choice for preventing the risk of hypercoagulation, for example the appearance of post-operative thrombosis. However excessive amounts of heparin may be at the origin of serious hemorrhagies. Hence, considerable care must be exercised to utilize the proper amount of heparin to prevent hypercoagulation without utilizing a sufficient amount to cause hemorrhagies. Hence, it is necessary to keep a constant watch on the patient and adjustments in heparin administration made depending on the results of blood coagulation tests which must be administered at regular intervals.

It is an object of this invention to provide medicaments which overcome the difficulties and constant testing that are associated with heparin administration. This is accomplished by providing compounds that are much more effective than heparin in preventing the risk of hypercoagulation when compared to the associated side effect of causing hemorrhagies.

U.S. Pat. No. 4,281,108 discloses a process for obtaining low molecular weight heparin comprising acidification of heparin, depolymerization in the presence of peroxides, and sulfation. The molecular weights of the products are 4,000 to 12,000 daltons. An anti-Xa/APTT ratio greater than 1 is claimed for the products of this patent.

U.S. Pat. No. 4,303,651 teaches the depolymerization of heparin with nitrous acid or by periodate oxidation to produce low molecular weight heparin fragments exhibiting improved inhibition of activated factor X. Said low molecular weight heparin fragments contain 14–18 sugar units.

U.S. Pat. No. 4,351,938 discloses a process for the preparation of heparin derivatives exhibiting an improved anti-Xa value. Said heparin derivatives exhibit a molecular weight of 2,000–7,000 daltons (compared to the molecular weight of commercial heparin of 10,000 to 25,000 daltons) and possess analyzable reducing end groups of which the majority are anhydromannose.

U.S. Pat. No. 4,396,762 discloses a heparin product obtained by degradation of heparin with heparinase from *Flavobacterium heparinum* (ATCC 13125) or mutants thereof having ability to reduce the coagulation activity of factor X while not affecting the coagulation activity of thrombin.

U.S. Pat. No. 4,401,662 discloses oligosaccharides obtainable from heparin, said oligosaccharides comprising not more than 8 saccharide units one of which is an N-sulfate-3-O-sulfate-D-glucosamine unit. These oligosaccharides may be separated from heparin by means of gel filtration and exhibit a highly selective activity against activated factor X (factor Xa). This results in a strong antithrombotic activity while avoiding the risk of hemorrhage for the patient.

U.S. Pat. No. 4,401,758 teaches a process for producing oligosaccharides having a highly selective activity against activated factor X (factor Xa) of blood i.e. a strong antithrombotic activity while avoiding the risk of hemorrhage. Said process involves depolymerizing heparin and separating the desired oligosaccharides by contacting with AT III (antithrombin III) followed by a subsequent separation of the desired oligosaccharides from AT III.

U.S. Pat. No. 4,415,559 discloses an anticoagulant containing heparin having low antithrombin III affinity as an effective ingredient and which provides a reduced danger of hemorrhage. The low antithrombin III affinity heparin is separated from commercial heparin by affinity chromatography utilizing a gel lattice to which is bonded antithrombin III. The desired heparin fraction is not absorbed by the lattice-bound antithrombin III gel.

U.S. Pat. No. 4,438,108 describes a mixture of oligo- and polysaccharides having an improved anti-thrombotic activity vs. hemorrhagic activity as compared to heparin. The product described in this patent can be liberated from mammalian tissue by autolysis or with the aid of proteolytic enzymes followed by isolation using organic solvents, quaternary aliphatic ammonium compounds and/or a basic ion exchanger.

U.S. Pat. No. 4,438,261 discloses chemically partially depolymerized heparin having a molecular weight of from about 2000 to 7000 daltons and having analyzable reducing end groups of which the majority are anhydromannose groups. This product exhibits an improved therapeutic index which is defined in this patent as the ratio of the anti-Xa activity to the USP activity.

U.S. Pat. No. 4,474,770 discloses oligosaccharides obtainable from heparin, said oligosaccharides comprising not more than 8 saccharide units one of which is an N-sulfate-D-glucosamine unit. These oligosaccharides exhibit a high anti-Xa activity relative to heparin while the global coagulation activity relative to heparin is very low. Thus, the oligosaccharides are claimed to be advantageously useful for antithrombotic treatment without hemorrhage risks.

U.S. Pat. No. 4,486,420 discloses heparinic mucopolysaccharide fractions which have improved antithrombotic activity in vivo (measured in terms of activity of anti-Xa per milligram) compared to heparin and which are more selective with respect to anti-Xa activity than heparin. Said fractions have a molecular weight in the range of about 2,000 to 10,000 daltons and are insoluble in alcohol.

U.S. Pat. No. 4,500,519 describes a process for producing mucopolysaccharide heparinic fractions having improved anti-Xa activity compared to heparin. Said fractions are prepared by depolymerizing heparin to a molecular weight range of 2,000 to 8,000 and separating fractions having selected terminal structures.

U.S. Pat. No. 4,533,549 discloses a derivative of heparin having a molecular weight of from about 2,500 to 4,000 daltons and improved anti-Xa activity relative to global anticoagulant activity.

U.K. Pat. No. GB 2,002,406B teaches the sulfation of a low molecular weight heparin having a molecular weight of from 2,600 to 5,500. An improved antithrombotic activity (anti Xa activity) to the anti-blood clotting activity (KCCT activity) is claimed for the products of this invention vs. heparin.

Canadian Pat. No. 1,195,322 discloses a process for obtaining low molecular weight heparin comprising the steps of acidifying normal heparin, and depolymerizing in the presence of an oxidizing agent to obtain a low molecular weight heparin product. An anti-Xa/APTT ratio of "almost two" is disclosed.

L. O. Andersson et al. in THROMBOSIS RESEARCH, Vol. 9, 1976 pages 575-583 discusses fractions of varying molecular weight isolated from heparin. The molecular weights of the fractions varied from 5,000 to 40,000. Anti-Xa and APTT tests were run on the various fractions. In general, the data indicated that the lower molecular weight fractions exhibited higher anti-Xa values in relation to the APTT values.

The prior art substances derived from heparin and having improved anti-Xa activity in relation to global anticlotting activity have been obtained by isolating lower molecular weight fractions from heparin and/or depolymerizing heparin. We have been able to produce substances having improved anti-Xa activity in relation to global activity by using an entirely different and novel approach.

Unexpectedly, it has been observed that acetyl derivatives of heparin exhibit a high anti-Xa (Coatest anti-Xa test kit from KabiVitrum AB, Stockholm, Sweden) activity in relation to APTT (Activated Partial Thromboplastine Time see Andersson et al., Thromb. Res. 9, 575 (1976)) activity, the latter being a measure of global anticlotting activity. This overcomes the problems associated with prior art methods of producing anticoagulants exhibiting high anti-Xa activity in relation to global anticoagulant activity.

The preferred method of forming acetyl derivatives of heparin is by the reaction between acetyl chloride and heparin. However, as is obvious to one skilled in the art, there are numerous methods and variations that may be employed to for the acetyl derivatives.

Without limitation as to the scope of the invention, it is theorized that a preponderance of the ester groups formed by the reaction of an acid chloride with heparin result from the reaction of the free hydroxyl groups of heparin with the acid chloride.

The following examples are given by way of illustration only and are not to be considered as limiting of this invention.

EXAMPLE I 2 grams of heparin (porcine intestinal mucosa) was added to a 250 milliliter round bottom flask protected from the atmosphere by a drying tube. To this was added 24 milliliters of formamide and 24 milliliters of pyridine. The flask was placed in an oil bath maintained at 40° C. 2 milliliters of acetyl chloride was added slowly over a 3-4 hour period with agitation and agitation continued overnight.

50 milliliters of water was then added with agitation. The contents of the flask were then placed in a 2000 molecular weight cutoff dialysis bag (Spectrum Medical Industries, Los Angeles, Calif.). Dialysis was conducted against a 1% (w/v) sodium chloride solution for 24 hours. The dialysis against 1% sodium chloride was repeated three times.ABC Dialysis was then conducted against water for 24 hours. The dialysis against water was then repeated three times.

The contents of the dialysis bag were then lyophilized to obtain a dry, white powder.

EXAMPLE II

The product of example I was analyzed for anti-Xa and found to exhibit a value of 130 units per milligram. The product of example I was analyzed for APTT and found to exhibit an APTT value of 34.4 units per milligram. The anti-Xa/APTT ratio was thus found to be 3.8. This compares to the known ratio of 1.0 for heparin.

EXAMPLE III

The infrared spectrum was obtained on the product of example I. An absorption peak was observed at 1732 cm$^{-1}$. This peak is characteristic of an ester group. Said peak was not present in the starting heparin.

EXAMPLE IV

The number of ester groups per tetrasaccharide unit contained in the product of example I was measured following the method of S. Hestrin, J. BIOL. CHEM, vol 180, pages 249-261, 1949. Butyryl choline chloride was used as the ester standard. A theoretical formula weight of 1229 was used for a tetrasaccharide unit. The results indicated the presence of 1.3 acetyl groups per tetrasaccharide unit.

EXAMPLE V 2 grams of heparin (porcine intestinal mucosa) was added to a 250 milliliter round bottom flask protected from the atmosphere by a drying tube. To this was added 24 milliliters of formamide and 24 milliliters of pyridine. The flask was placed in an oil bath maintained at 40° C. 40 milliliters of acetyl chloride was added slowly over a 3-4 hour period with agitation and agitation continued overnight.

50 milliliters of water was then added with agitation. The contents of the flask were then placed in a 2000 molecular weight cutoff dialysis bag (Spectrum Medical Industries, Los Angeles, Calif.). Dialysis was conducted against a 1% (w/v) sodium chloride solution for 24 hours. The dialysis against 1% sodium chloride was repeated three times. Dialysis was then conducted against water for 24 hours. The dialysis against water was then repeated three times.

The contents of the dialysis bag were then lyophilized to obtain a dry, white powder.

EXAMPLE VI

The product of example V was analyzed for anti-Xa and found to exhibit a value of 79 units per milligram. The product of example V was analyzed for APTT and found to exhibit an APTT value of 6.5 units per milligram. The anti-Xa/APTT ratio was thus found to be 12.2. This compares to the known ratio of 1.0 for heparin.

EXAMPLE VII

The number of ester groups per tetrasaccharide unit contained in the product of example V was measured following the method of S. Hestrin, J. BIOL. CHEM, vol 180, pages 249-261, 1949. Butyryl choline chloride was used as the ester standard. A theoretical formula weight of 1229 was used for a tetrasaccharide unit. The results indicated the presence of 5.4 acetyl groups per tetrasaccharide unit.

EXAMPLE VIII

The infrared spectrum was obtained on the product of example V. An absorption peak was observed at 1740 $cm^{-1}$. This peak is characteristic of an ester group. Said peak was not present in the starting heparin.

The above description is for the purpose of teaching the person skilled in the art how to practice the present invention. This description is not intended to detail all of the obvious modifications and variations of the invention which will become apparent upon reading. However, the applicants do intend to include all such obvious modifications and variations within the scope of their invention which is defined by the following claims.

We claim:

1. An ester of heparin characterized by an anti-Xa/APTT ratio greater than 1.5.

2. An ester of claim 1 wherein the ester is prepared by reacting an acid chloride with heparin.

3. An ester of claim 1 wherein more than 50% of the ester groups are aliphatic.

4. An ester of claim 3 containing more than 0.1 ester groups per tetrasaccharide unit.

5. An ester of heparin containing more than 0.1 acetyl groups per tgetrasaccharide unit.

6. An ester of claim 5 wherein the ester is prepared by reacting acetyl chloride with heparin.

7. An ester of heparin formed by replacing the free hydroxyl groups of heparin with ester groups, said ester characterized by an anti-Xa/APTT ratio greater than 1.5.

8. An ester of claim 7 wherein the ester is prepared by reacting an acid chloride with heparin.

9. An ester of heparin formed by replacing the free hydroxyl groups of heparin with ester groups, said ester containing more than 0.1 acetyl groups per tetrasaccharide unit.

10. An ester of claim 9 wherein the ester is prepared by reacting acetyl chloride with heparin.

11. An ester of heparin characterized by an anti-Xa/APTT ratio greater than 1.5, wherein the ester is prepared by reacting an acid chloride with heparin, and wherein more than 50% of the ester groups are aliphatic.

12. An ester of heparin characterized by an anti-Xa/APTT ratio greater than 1.5, wherein the ester is prepared by reacting an acid chloride with heparin, wherein more than 50% of the ester groups are aliphatic and wherein the ester contains more than 0.1 ester groups per tetrasaccharide unit.

13. An ester of heparin formed by replacing the free hydroxyl groups of heparin with ester groups, said ester characterized by an anti-Xa/APTT ratio greater than 1.5, wherein the ester is prepared by reacting an acid chloride with heparin, and wherein more than 50% of the ester groups are aliphatic.

14. An ester of heparin formed by replacing the free hydroxyl groups of heparin with ester groups, said ester characterized by an anti-Xa/APTT ratio greater than 1.5, wherein the ester is prepared by reacting an acid chloride with heparin, wherein more than 50% of the ester groups are aliphatic and wherein the ester contains more than 0.1 ester groups per tetrasaccharide unit.

15. An ester of heparin formed by replacing the free hydroxyl groups of heparin with ester groups, said ester characterized by an anti-Xa/APTT ratio greater than 1.5, wherein more than 50% of the ester groups are aliphatic.

16. An ester of heparin formed by replacing the free hydroxyl groups of heparin with ester groups, said ester characterized by an anti-Xa/APTT ratio greater than 1.5, wherein more than 50% of the ester groups are aliphatic and wherein the ester contains more than 0.1 ester groups per tetrasaccharide unit.

17. A pharmaceutically active composition comprising a pharmaceutically acceptable carrier or diluent and, as the pharmaceutically active component, a product as claimed in any one of claims 1-16

* * * * *